(12) United States Patent
Abrahams et al.

(10) Patent No.: US 9,002,853 B2
(45) Date of Patent: *Apr. 7, 2015

(54) GENERATION OF SERVICE SPECIFICATION OF A SERVICE ORIENTED ARCHITECTURE (SOA) SOLUTION

(71) Applicant: International Business Machines Corporation, Armonk, NY (US)

(72) Inventors: Faried Abrahams, Laytonsville, MD (US); Kerard R. Hogg, Riddells Creek (AU); Kent R. Ramchand, Melbourne (AU); Gandhi Sivakumar, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 102 days.

This patent is subject to a terminal disclaimer.

(21) Appl. No.: 13/732,504

(22) Filed: Jan. 2, 2013

(65) Prior Publication Data

US 2013/0124520 A1 May 16, 2013

Related U.S. Application Data

(63) Continuation of application No. 12/759,166, filed on Apr. 13, 2010, now Pat. No. 8,386,524.

(51) Int. Cl.
*G06F 17/30* (2006.01)
*G06F 9/44* (2006.01)

(52) U.S. Cl.
CPC ............ *G06F 17/30286* (2013.01); *G06F 8/30* (2013.01)

(58) Field of Classification Search
USPC ......................................... 707/2, 3, 793, 741
See application file for complete search history.

(56) References Cited

U.S. PATENT DOCUMENTS

| 7,222,302 | B2 | 5/2007 | Hauser et al. | |
| 8,386,524 | B2 * | 2/2013 | Abrahams et al. | 707/793 |
| 2007/0061731 | A1 | 3/2007 | Dillon et al. | |
| 2011/0252037 | A1 | 10/2011 | Abrahams et al. | |

OTHER PUBLICATIONS

Mohanram B. et al. Automating Business Processes of Telecom Service Providers Using BPM and Web Services for NGOSS. Released Feb. 1, 2003. tmforum. [online]. [retrieved on Mar. 31, 2010]. Retrieved from the Internet:<URL: http://www.tmforum.org/browse.aspx?linkID=27542&docID=1816>.

(Continued)

*Primary Examiner* — Etienne Leroux
(74) *Attorney, Agent, or Firm* — Schmeiser, Olson & Watts, LLP; John Pivnichny

(57) ABSTRACT

A system and associated method for automatically generating a service specification of a Service Oriented Architecture (SOA) solution. A process model framework and a data model framework are received as inputs. Processes in the process model framework perform services of various complexity levels. Processes are decomposed into a respective set of atomic service processes in the lowest complexity level and data objects are extracted from the decomposed atomic service processes. The data objects are associated with data elements of the data model framework. The data model framework is extended and flexibility patterns are added for reusability of the service specification. The service specification of the SOA solution is generated as process interfaces represented with the data objects according to inputs from a user customizing aspects of the service specification, for either a desired service of the SOA solution or a desired process in the process model framework.

20 Claims, 12 Drawing Sheets

(56) References Cited

OTHER PUBLICATIONS

GB922, Information Framework (SID) Solution Suite, Release 8.0. tmforum. [online]. [retrieved on Mar. 31, 2010]. Retrieved from the Internet:<URL: http://www.tmforum.org/DocumentsInformation/35499/article.html?linkid=35499>.

Documents—Business Process Framework (eTOM). tmforum. [online]. [retrieved on Mar. 31, 2010]. Retrieved from the Internet:<URL: http://www.tmforum.org/BestPracticesStandards/DocumentsBusiness/1649/Home.html>.

Document Solution Suites. tmforum. [online]. [retrieved on Mar. 31, 2010]. Retrieved from the Internet:<URL: http://www.tmforum.org/Resources/DocumentSolutionSuites/2024/Home.html#PageAnchor6076>.

MTOSI Solution Suite Release 2.0. tmforum. [online]. [retrieved on Mar. 31, 2010]. Retrieved from the Internet:<URL: http://www.tmforum.org/MTOSIRelease20/MTOSISolutionSuite/35252/article.html>.

TMF211, Active Catalog NGOSS Contract. tmforum. [online]. [retrieved on Mar. 31, 2010]. Retrieved from the Internet:<URL: http://www.tmforum.org/Contracts/TMF211ActiveCatalog/34048/article.html>.

IBM. IBM Telecom Operations Content Pack for WebSphere Business Services Fabric, Version 6.1. [online]. 2 pages. [retrieved on Mar. 31, 2010]. Retrieved from the Internet:<URL: ftp://ftp.software.ibm.com/software/websphere/integration/wbsf/WBSF_Telecom_10.12.07a.pdf>.

Fiammante, M. Use of Telecom Standards in Telecom Operations Content Pack. IBM SOA Architect Summit, May 22, 2008. p. 22. [online]. [retrieved on Mar. 31, 2010]. Retrieved from the Internet:<URL: ftp://ftp.software.ibm.com/software/fr/solutions_soa_fiammante_as.pdf>.

IBM. Help—IBM WebSphere Business Process Management Version 7.0 information center. [online]. 1 page. [retrieved on Mar. 31, 2010]. Retrieved from the Internet:<URL: http://publib.boulder.ibm.com/infocenter/dmndhelp/v7r0mx/topic/com.ibm.ws.icp.telopr.doc/tel/opr/opra/concept/appra2tel/c_rarclogview.html>.

Richardson, T. Impact of SOA on TM Forum Specifications. TM Forum, 2008. 31 pages.

Office Action (Mail Date Feb. 14, 2012) for U.S. Appl. No. 12/759,166, filed Apr. 13, 2010.

Amendment filed May 14, 2012 in response to Office Action (Mail Date Feb. 14, 2012) for U.S. Appl. No. 12/759,166, filed Apr. 13, 2010.

Final Office Action (Mail Date Jul. 30, 2012), for U.S. Appl. No. 12/759,166, filed Apr. 13, 2010.

Amendment after Final filed Sep. 26, 2012 in response to Final Office Action (Mail Date Jul. 30, 2012) for U.S. Appl. No. 12/759,166, filed Apr. 13, 2010.

Notice of Allowance (Mail Date Oct. 19, 2012) for U.S. Appl. No. 12/759,166, filed Apr. 13, 2010.

* cited by examiner

GENERATION OF SERVICE SPECIFICATION OF A SERVICE ORIENTED ARCHITECTURE (SOA) SOLUTION

This Application is a Continuation Application claiming priority to Ser. No. 12/759,166, Filed Apr. 13, 2010, now U.S. Pat. No. 8,386,524, issued Feb. 26, 2013.

BACKGROUND OF THE INVENTION

The present invention discloses a system and associated method for automatically generating service specifications for a Service Oriented Architecture (SOA) solution, in the field of, inter alia, object-oriented design for computerized industry-specific business solutions and automated implementations thereof. Conventional method for developing a SOA solution utilizes industry-specific data models and process models. Because industry-specific data models and process models are separately adapted to describe data objects and process elements in respective models, specifying services of the SOA solution in a manner compatible with both data models and the process models is labor-intensive and costly, and manually generated service specifications are difficult to implement.

BRIEF SUMMARY

According to one embodiment of the present invention, a method for automatically generating service specifications of a Service Oriented Architecture (SOA) solution comprises receiving a process model framework and a data model framework by a processor of a computer system, the process model framework comprising at least one process, each process of said at least one process performing a respective service of the SOA solution, each process being associated with a respective level in a hierarchy based on complexity of the respective service performed by each process, the data model framework comprising at least one data element that is indirectly matched to said at least one process; decomposing each process into at least one atomic service process, each process manipulating at least one data object of the SOA solution, said at least one data object associating each process to said at least one data element, such that each process is mapped to a respective set of said at least one atomic service process that manipulates a respective set of said at least one data object, wherein the respective set of said at least one atomic service process performs a service equivalent to the respective service performed by each process; customizing the service specification of the SOA solution pursuant to at least one user input received from a user such that the service specification is compatible with both the process model framework and the data model framework, wherein the service specification represents a respective process interface of each atomic service process of said at least one atomic service process that performs a respective atomic service in the SOA solution; and storing the customized service specification in a database coupled to the computer system, wherein the database comprises a data model extension and a service specification data structure such that the data model framework is enhanced with reusable attributes and patterns in generating another service specification.

According to one embodiment of the present invention, a computer program product comprises a computer readable memory unit that embodies a computer readable program code. The computer readable program code contains instructions that, when run by a processor of a computer system, implement a method for automatically generating service specifications of a Service Oriented Architecture (SOA) solution.

According to one embodiment of the present invention, a computer system comprises a processor and a computer readable memory unit coupled to the processor, wherein the computer readable memory unit containing instructions that, when run by the processor, implement a method for automatically generating service specifications of a Service Oriented Architecture (SOA) solution.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for automatically generating service specifications of a Service Oriented Architecture (SOA) solution.

DETAILED DESCRIPTION

Figure 1:
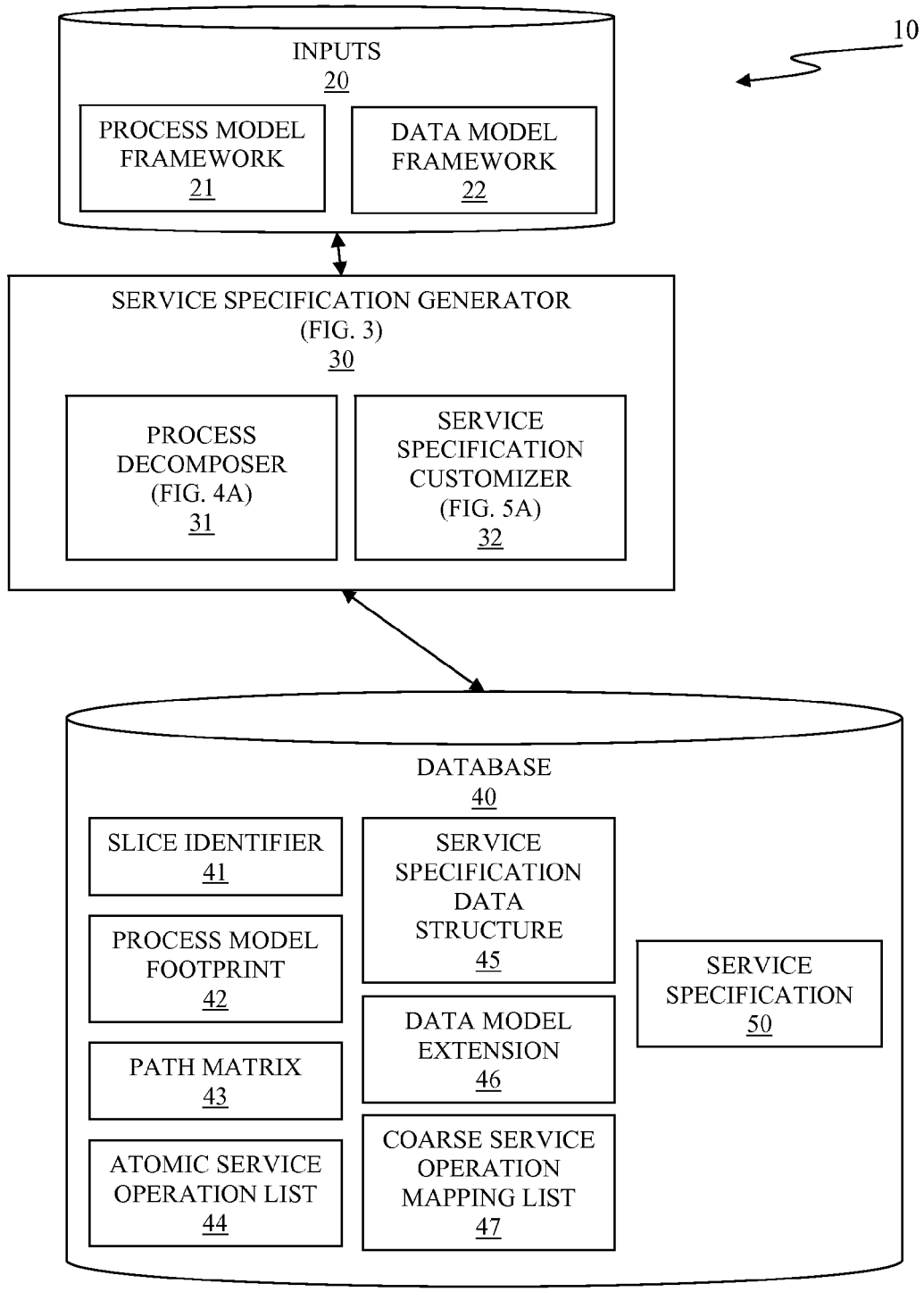
FIG. 1 illustrates a system for automatically generating a service specification of a Service Oriented Architecture (SOA) solution, in accordance with embodiments of the present invention.

FIG. 1 illustrates a system 10 for automatically generating a service specification of a Service Oriented Architecture (SOA) solution, in accordance with embodiments of the present invention.

The system 10 comprises inputs 20, a service specification generator 30, and a database 40. The service specification generator 30 receives the inputs 20 and stores data items generated from processing the inputs 20 into the database 40. The service specification generator 30 generates the service specifications of the SOA solution that are compatible with frameworks of the inputs 20 and implementation-oriented. The inputs 20 and the database 40 are distinguished only from the perspective of the service specification generator 30. According to one embodiment of the present invention, the inputs 20 and the database 40 is implemented as one physical data storage. In another embodiment of the present invention, the inputs 20 and the database 40 is implemented by use of a respective physical storage medium.

The service oriented architecture (SOA) solution comprises service modules, or simply services. In this detailed description, the term "service" is defined, in the context of the SOA solution, as a well-defined, self-contained, and independent function within the SOA solution. In this detailed description, the term "service specification" is defined, in the context of the SOA solution, as an implementation-oriented description of a service interface comprising processing components and data components.

In one embodiment of the present invention, the service specifications are generated in the Web Services Description Language (WSDL). In the same embodiment, the SOA solution is designed according to the Next Generation Operations Systems and Software (NGOSS) Solution Frameworks published by TeleManagement (TM) Forum. The NGOSS Solution Frameworks are commonly used to develop a SOA solution to provided services in telecommunication industry.

The inputs 20 comprise a process model framework 21 and a data model framework 22. The process model framework 21 is a model of business processes to provide services of the SOA solution. The process model framework 21 is organized in a hierarchy based on respective complexities of the business processes. Each business process in the process model framework 21 corresponds to at least one service of a respective granularity level within the SOA solution, according to the functional complexity of each business process. Each business process in the process model framework 21 operates by manipulating data objects of the SOA solution. In this specification the term "manipulating" refers to data operation of any kind, inter alia, insertion, deletion, update, etc., in the context of database technology.

In this specification, the terms "complexity" and "granularity" are used interchangeably to represents a simpler process has a lower granularity that provides a service of lower complexity. The term "hierarchy" is used in the context of the SOA solution to indicate complexity levels of services that is associated with respective processes of the process model framework. The term "atomic service" is defined as a smallest meaningful element of services provided in the SOA solution. The term "atomic service process" is defined as a process of the process model framework that provides a respective atomic service. The term "coarse service" is defined as a complex service provided in the SOA solution, which is equivalent to a respective combination of atomic services. The term "coarse service process" is defined as a process of the process model framework that provides a respective coarse service. Atomic service processes are in the lowest level of the hierarchy of the process model framework. Coarse service processes are in a level higher than the atomic service processes in the hierarchy of the process model framework.

The data model framework 22 is a model for data objects for the SOA solution. The data elements of the data model framework 22 and the parameters of the processes of the process model framework 22 do not correspond. In this specification, terms "data component" and "data element" indicate a data item without processing capability, generically or in the context of the data model framework 22. In contrast, the term "data object" is defined as a data item utilized the SOA solution, which is derived from data components used in processes of the process model framework 21.

In one embodiment of the present invention, the process model framework 21 employs the Business Process Framework referred to as "the Enhanced Telecom Operations Map® (eTOM)," which is a process model element of the NGOSS Solution Frameworks by TM Forum. In the same embodiment of the present invention, the data model framework 22 employs the Information Framework referred to as "Shared Information/Data model (SID)," which is a data model element of the NGOSS Solution Frameworks by TM Forum. The NGOSS Solution Frameworks have other elemental frameworks for respectively designated functionalities which are not related to the present invention.

Although the eTOM and SID frameworks are components of the NGOSS Solution Frameworks, eTOM processes and SID data elements are not interrelated. Because each SID data element is only related to other SID data elements and operates according to attributes and interactions of other interdependent SID data elements, interrelationship amongst SID data elements is complex. Also, eTOM Framework does not represent eTOM processes with implementation-oriented specifics. Consequently, in conventional method of developing a SOA solution utilizing the eTOM and SID frameworks, implementing eTOM processes by representing parameters of eTOM processes as SID data elements is costly and inefficient. Conventional methods of mapping the process model framework and the data model framework are at domain level or at conceptual Aggregate Business Entity (ABE) level, which do not include implementation-oriented specifics of the SOA solution.

By automatically generating implementation-oriented service specifications of the SOA solution, the method of the present invention provides a systematic way to relate the process model framework with the data model framework in developing the SOA solution. The method of the present invention may be employed in generating an industry-specific SOA solution from industry-specific process model and data model instead of developing a custom-designed SOA solution from scratch. In conventional development of the SOA solution, industry-specific process model and data model only provides a template of the SOA solution, but implementation-dependent specifics of the SOA solution such as service interface specification must be manually configured.

The service specification generator 30 receives the inputs 20 and stores data items generated from processing the inputs 20 into the database 40. The service specification generator 30 comprises a process decomposer 31 and a service specification customizer 32. See descriptions of FIG. 3, infra, for detailed steps of the service specification generator 30. The processor decomposer 31 breaks down coarsely grained business processes in the process model framework 21 into component business processes of a lowest granularity level. In this specification, the term "atomic service" is defined as a service of the lowest granularity level. Services of higher granularity levels are referred to as "coarse services," which is represented as a combination of atomic services. See descriptions of FIG. 4A, infra, for detailed steps of the process decomposer 31. The service specification customizer 32 generates a respective service specification for each business process that is also compliant with the data model framework 22 to implement the business process as a service in the SOA solution. If the business process provides a coarse service within the process model framework 21, service specifications of all component business processes of the business process that provide a respective atomic service comprising the coarse service are generated. The service specification customizer 32 produces and stores the service specifications into the database 40. See descriptions of FIG. 5A, infra, for detailed steps of the service specification customizer 32.

In one embodiment of the present invention, the specification generator 30 is a component of Telco Strategic Process Modeler (TSPM) modeling tool from IBM® to automatically generate service specifications to implement a specific SOA solution modeled by the TSPM tool. (IBM is a registered trademark of the International Business Machines, Inc., in the United States.) The service specifications are generated for each business process specified in the TSPM tool, according to a respective granularity level of business processes. If a business process is of a coarse granularity level, a service specification for the business process is generated by combining one or more service specifications for component business processes of the business process. The respective service specifications of the component business processes have a respective granularity level finer than the coarse granularity level of the business process. The service specifications are directly implemented upon adjusting middleware compatibility, which is not available with service specifications generated in conventional manual designs.

The database 40 comprises a slice identifier 41, a process model footprint 42, a path matrix 43, an atomic service operation list 44, a service specification data structure 45, a data model extension 46, a coarse service operation mapping list 47, and a service specification 50.

The slice identifier 41 identifies each decomposed slice of processes of the process model framework 21. Because all processes are decomposed to have the lowest granularity level in the hierarchy of the process model framework 21, the slices are referred to as leveled processes. In this specification, the term "slice identifier" is defined as an identifier of a process slice within the SOA solution. The slice identifier 41 is generated by the process decomposer 31. Each decomposed slice of processes is referred to as a process slice, or simply a slice. See descriptions of FIG. 4A, infra, for a step generating the slice identifier 41.

The process model footprint 42 represents the business processes in the process model framework 21 related to the slice identifier 41 by use of the service specification data structure 45. The process model footprint 42 is generated by the process decomposer 31. See descriptions of FIG. 4A, infra, for a step generating the process model footprint 42.

The path matrix 43 is associated with said each decomposed slice of processes identified by the slice identifier 41. Each decomposed slice employs a respective set of data objects comprising an anchor object. The path matrix 43 comprises the respective set of data objects and respective paths from the anchor objects to all other data objects in the path matrix 43. The path matrix 43 further comprises respective paths from each slice to all other slices. See descriptions of FIG. 4A, infra, for a step generating the path matrix 43.

The atomic service operation list 44 is a list of atomic services identified in the process model framework 21. Each atomic service of the atomic service operation list 44 is respectively associated with service operations to provide for the atomic service. See descriptions of FIG. 4A, infra, for a step generating the atomic service operation list 44.

The service specification data structure 45 is a normalized data model of the data model framework 22 that represents data objects of the decomposed process slices. The service specification data structure 45 comprises flexibility data patterns that make the data elements of the data model framework 22 more flexible for the SOA solution and to be reused in various service specifications. An example of the additional data patterns may be, inter alia, a self referencing pattern in object-oriented programming concepts to encapsulate multi-level hierarchy of incoming/outgoing messages. See descriptions of FIGS. 4A, 4B and 4C, infra, for a step generating the service specification data structure 45.

The data model extension 46 is an extended characteristic of a data object of the process slice. The data model extension 46 may be, inter alia, attribute, object, relation level, etc. The data model extension 46 is defined in various applicability levels such that one data model extension may be generally applicable to industry data model and utilized in updating the data model framework 22, and another data model extension may be applied only to the specific SOA solution. See descriptions of FIG. 4A, infra, for a step generating the data model extension 46.

The coarse service operation mapping list 47 is a list that maps operations of a coarse service to atomic service operations listed in the atomic service operation list 44. In this specification, the term "coarse service" is defined as a service of a granularity level that is higher than the lowest level of the hierarchy in the process model framework, of which operations are performed as a combination of multiple atomic service operations. See descriptions of FIG. 4A, infra, for a step generating the coarse service operation mapping list 47.

The service specification 50 is, as defined above, an implementation-oriented description of a service interface comprising processing elements of the process model framework 21 and data elements of the data model framework 22. See descriptions of FIG. 3, infra, for steps generating the service specification 50.

In one embodiment of the present invention, the slice identifier ID1 represents a leveled eTOM process model footprint CustomerDetailsManagement. An atomic service operation list of the slice is ": operations: CreateCustomerDetails, ModifyCustomerDetails, RetrieveCustomerDetails, DeleteCustomerDetails", wherein "CreateCustomerDetails", "ModifyCustomerDetails", "RetrieveCustomerDetails", and "DeleteCustomerDetails" are atomic service operations to be performed to provide a service "CustomerDetailsManagement" that has Level 3 granularity, which is the finest granularity level representing atomic operations in the eTOM process model framework hierarchy. In the same embodiment, a process of Level 2 granularity level is internally mapped into Level 3 granularity processes, and a process of Level 1 granularity level is first mapped into Level 2 granularity processes and then mapped into atomic operations of Level 3 granularity processes.

Figure 2A:
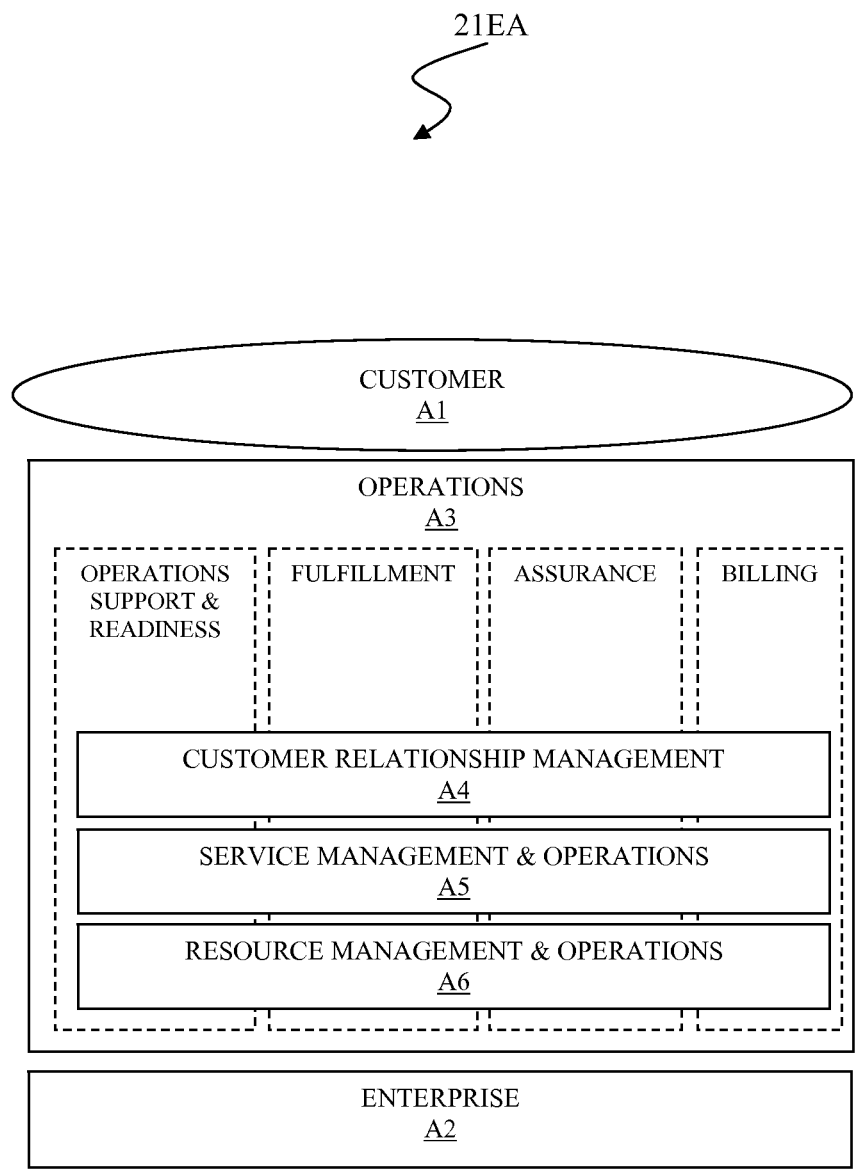
FIG. 2A is a first example of the process model framework in the inputs of FIG. 1, represented in eTOM process model framework map format, in accordance with the embodiments of the present invention.

FIG. 2A is a first example 21Ea of the process model framework in the inputs 20 of FIG. 1, supra, represented in eTOM process model framework map format, in accordance with the embodiments of the present invention.

The first example 21EA is an eTOM map that illustrates processes in the eTOM Business Process Framework of the NGOSS Solution Frameworks published by TM Forum. The processes in the eTOM map of the first example 21EA are categorized into multiple types comprising Enterprise A2 and Operations A3. The processes in the eTOM map of the first example 21EA may also be represented an eTOM tree that is equivalent to the eTOM map 21EA. See descriptions of FIG. 2B, infra, for details of an equivalent eTOM tree.

Figure 2B:
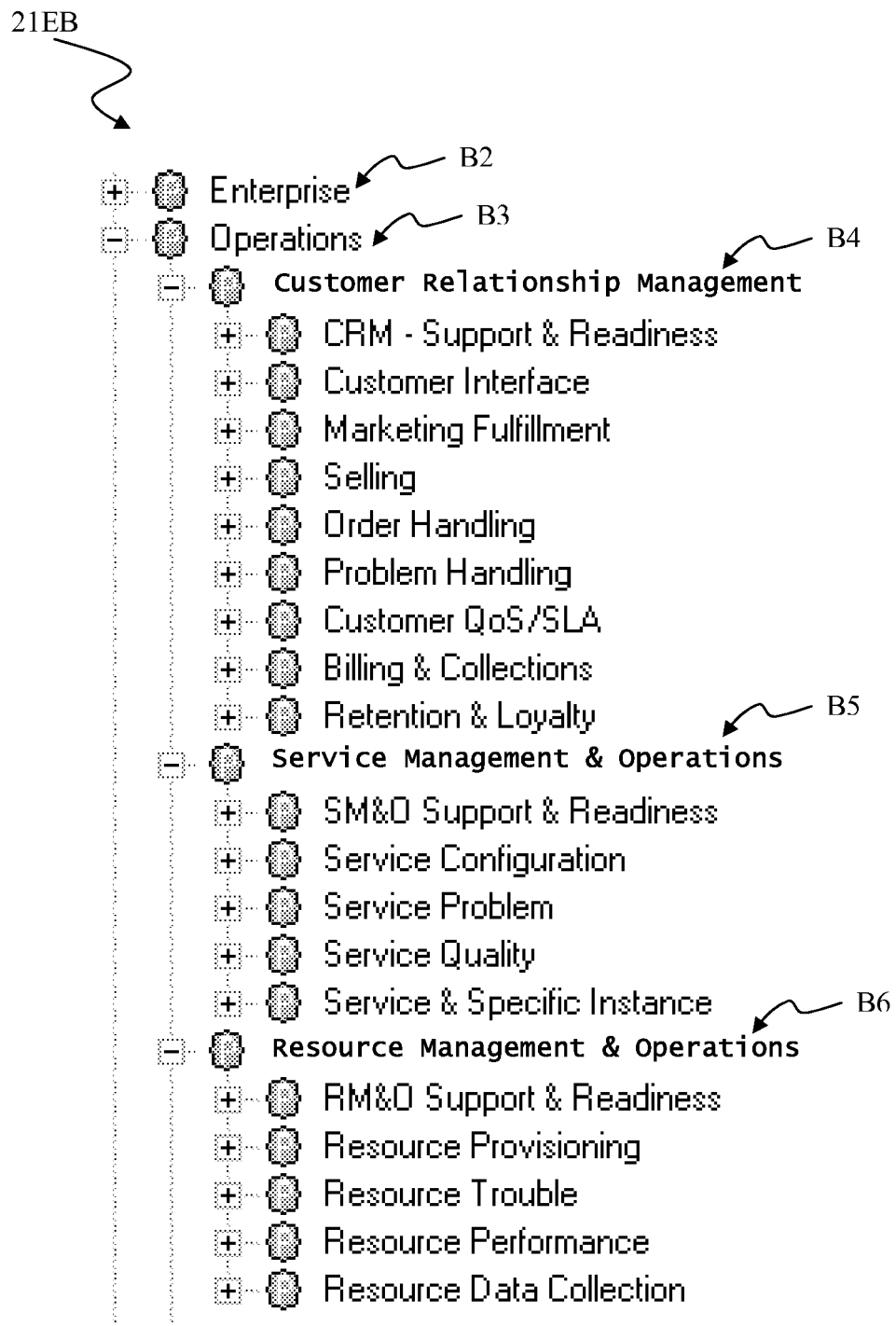
FIG. 2B is a second example of the process model framework in the inputs of FIG. 1, represented in eTOM process model framework tree format, in accordance with the embodiments of the present invention.

FIG. 2B is a second example 21EB of the process model framework in the inputs 20 of FIG. 1, supra, represented in eTOM process model framework tree format, in accordance with the embodiments of the present invention.

The second example 21EB is an eTOM tree that hierarchically represents processes in the eTOM Business Process Framework of the NGOSS Solution Frameworks published by TM Forum. The processes in the second example 21EB of the eTOM tree are respectively associated with data elements in the SID Information Framework, which is an embodiment of the data model framework 22 of FIG. 1, supra. The processes and data elements are associated by use of, inter alia, lexicographic matching of vocabulary between the process and related data elements, customized background information common to processes and data elements related to respective processes, etc.

Figure 2C:
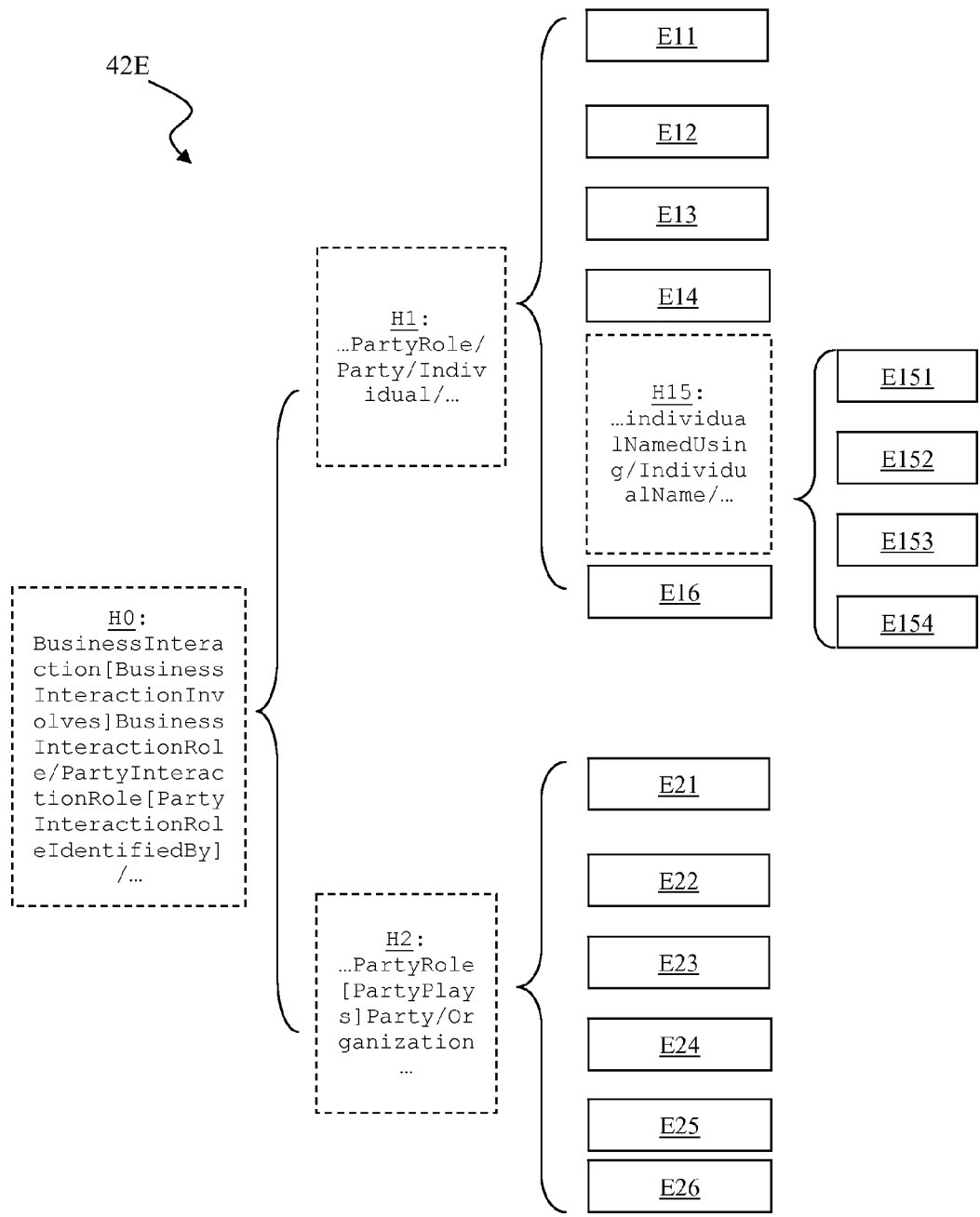
FIG. 2C is an example of the process model footprint in the database of FIG. 1, in accordance with the embodiments of the present invention.

FIG. 2C is an example 42E of the process model footprint 42 in the database 40 of FIG. 1, supra, in accordance with the embodiments of the present invention.

The example 42E of the process model footprint is created for a business process "ManageCustomerDetails" that manages customer information of an individual customer. Headers H0, H1, H15 and H2 are shown to represent similarities among multiple items of the example process model footprint 42E.

A first header H0 represents a common part "BusinessInteraction [BusinessInteractionInvolves]BusinessInteractionRole/PartyInteractionRole[PartyInteractionRoleIdentifiedBy]/" shared by the names of all example process model footprint items Ell, E12, E13, E14, E151, E152, E153, E154, E16, E21, E22, E23, E24, E25 and E26, to indicate that the items are relevant to a business transaction and parties to the business transaction according to roles of the parties. The first header H0 is represented in a dashed box to indicate that the first header H0 is not an item in the example process model footprint 42E.

A second header H1 represents a common part "BusinessInteraction[BusinessInteractionInvolves]BusinessInteractionRole/PartyInteractionRole[PartyInteractionRoleIdentifiedBy]/PartyRole/Party/Individual/" shared by the names of the example process model footprint items E11, E12, E13, E14, E151, E152, E153, E154 and E16, to indicate that the items are relevant to a party to the business transaction whose role is an individual person. The second header H1 is represented in a dashed box to indicate that the second header H1 is not an item in the example process model footprint 42E.

Item E11
"BusinessInteraction[BusinessInteractionInvolves]BusinessInteractionRole/PartyInteractionRole[PartyInteractionRoleIdentifiedBy]/PartyRole/Party/Individual/[aliveDuring]/TimePeriod/startDateTime, etc" specifies a life span of the individual person.

Item E12
"BusinessInteraction[BusinessInteractionInvolves]BusinessInteractionRole/PartyInteractionRole[PartyInteractionRoleIdentifiedBy]/PartyRole/Party/Individual/CountryOfBirth/Country/name" specifies a name of a country in which the individual person was born.

Item E13
"BusinessInteraction[BusinessInteractionInvolves]BusinessInteractionRole/PartyInteractionRole[PartyInteractionRoleIdentifiedBy]/PartyRole/Party/Individual/gender" specifies gender information indicating whether the individual person is male or female.

Item E14
"BusinessInteraction[BusinessInteractionInvolves]BusinessInteractionRole/PartyInteractionRole[PartyInteractionRoleIdentifiedBy]/PartyRole/Party/Individual/individualIdentifiedBy/PassportIdentification, DriversLicense, SocialSecurityNumberIdentification (with related attributes)" specifies detailed identification information such as supporting document used in identifying the individual person.

A third header H15 represents a common part "BusinessInteraction[BusinessInteractionInvolves]BusinessInteractionRole/PartyInteractionRole[PartyInteractionRoleIdentifiedBy]/PartyRole/Party/Individual/individualNamedUsing/IndividualName/" shared by the names of the example process model footprint items E151, E152, E153 and E154, to indicate that the items are relevant to a name of the individual person. The third header H15 is represented in a dashed box to indicate that the third header H15 is not an item in the example process model footprint 42E.

Item E151
"BusinessInteraction[BusinessInteractionInvolves]BusinessInteractionRole/PartyInteractionRole[PartyInteractionRoleIdentifiedBy]/PartyRole/Party/Individual/individualNamedUsing/IndividualName/aristocraticTitle, familyNameSuffix,formattedName,FormOfAddress, givenName,MiddleName,legalName, middleName, qualifications, etc" specifies detailed information on the name of the individual person.

Item E152
"BusinessInteraction[BusinessInteractionInvolves]BusinessInteractionRole/PartyInteractionRole[PartyInteractionRoleIdentifiedBy]/PartyRole/Party/Individual/individualNamedUsing/IndividualName/ValidFor/endDateTime, startDateTime" specifies validity information of the name of the individual person in cases for a name change of the individual person during a certain period.

Item E153
"BusinessInteraction[BusinessInteractionInvolves]BusinessInteractionRole/PartyInteractionRole[PartyInteractionRoleIdentifiedBy]/PartyRole/Party/Individual/individualNamedUsing/IndividualName/PartyNameDefinedUsing/Language/alphabetName" specifies a language in which the name of the individual person is defined.

Item E154
"BusinessInteraction[BusinessInteractionInvolves]BusinessInteractionRole/PartyInteractionRole[PartyInteractionRoleIdentifiedBy]/PartyRole/Party/Individual/individualNamedUsing/IndividualName/NameRuleCountry/Country/Name" specifies a name of a country in which the name of the individual person is defined.

Item E16

"BusinessInteraction[BusinessInteractionInvolves]BusinessInteractionRole/PartyInteractionRole[PartyInteractionRoleIdentifiedBy]/PartyRole[Party Plays]Party/Individual/[partyHas]/LanguageAbility{listeningProficiency, readingProficiency,speakingProficiency,writingProficiency}" specifies language ability of the individual person.

A fourth header H2 represents a common part "BusinessInteraction[BusinessInteractionInvolves]BusinessInteractionRole/PartyInteractionRole[PartyInteractionRoleIdentifiedBy]/PartyRole[Party Plays]Party/Organization" shared by the names of the example process model footprint items E21, E22, E23, E24, E25 and E26, to indicate that the items are relevant to a party to the business transaction that is an organization. The fourth header H2 is represented in a dashed box to indicate that the fourth header H2 is not an item in the example process model footprint 42E.

Item E21

"BusinessInteraction[BusinessInteractionInvolves]BusinessInteractionRole/PartyInteractionRole[PartyInteractionRoleIdentifiedBy]/PartyRole[Party Plays]Party/Organization{is LegalEntity,existsDuring,PartyId,ValidFor, type}" specifies that details of the organization comprise whether the organization is a legal entity, a period during which the organization exists, an identification of the organization, etc.

Item E22

"BusinessInteraction[BusinessInteractionInvolves]BusinessInteractionRole/PartyInteractionRole[PartyInteractionRoleIdentifiedBy]/PartyRole[Party Plays]Party/Organization/existsDuring/TimePeriod{endDateTime, StartDateTime}" specifies the period during which the organization exists.

Item E23

"BusinessInteraction[BusinessInteractionInvolves]BusinessInteractionRole/PartyInteractionRole[PartyInteractionRoleIdentifiedBy]/PartyRole[Party Plays] Party/Organization[hasRoles]/competitor" specifies information related to a competitor of the organization.

Item E24

"BusinessInteraction[BusinessInteractionInvolves]BusinessInteractionRole/PartyInteractionRole[PartyInteractionRoleIdentifiedBy]/PartyRole[Party Plays]Party/Organization[hasRoles]/organizationPost" specifies postal information of the organization.

Item E25

"BusinessInteraction[BusinessInteractionInvolves]BusinessInteractionRole/PartyInteractionRole[PartyInteractionRoleIdentifiedBy]/PartyRole[Party Plays]Party/Organization[OrganizationIdentifiedBy]/OrganizationIdentification/CompanyRegistration{issueDate, scan}" specifies identification of the organization relevant to registration information.

Item E26

"BusinessInteraction[BusinessInteractionInvolves]BusinessInteractionRole/PartyInteractionRole[PartyInteractionRoleIdentifiedBy]/PartyRole[Party Plays]Party/Organization[OrganizationNamedUsing]/OrganizationName{nameType, tradingName}" specifies name information of the organization, comprising a type of name and a trading name.

Figure 3:
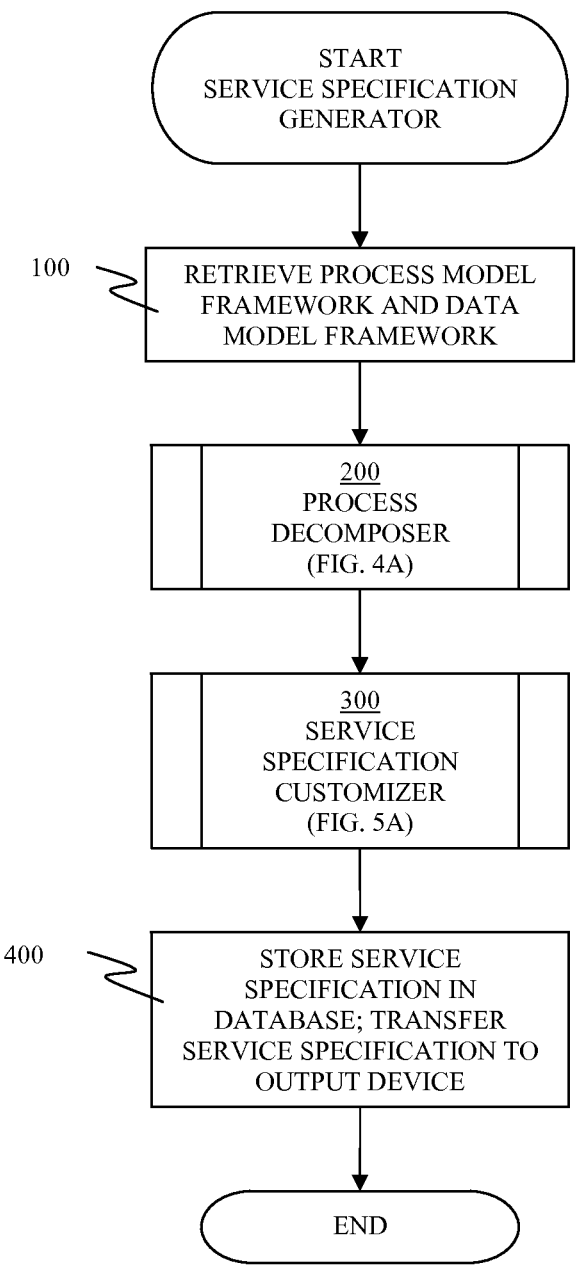
FIG. 3 is a flowchart depicting a method for automatically generating service specification of a Service Oriented Architecture (SOA) solution, as performed by the service specification generator of FIG. 1, in accordance with the embodiments of the present invention.

FIG. 3 is a flowchart depicting a method for automatically generating service specification of a Service Oriented Architecture (SOA) solution, as performed by the service specification generator of FIG. 1 supra, in accordance with the embodiments of the present invention.

The service specification generator generates the service specification by intertwining a process model framework and a data model framework provided as the inputs such that the generated service specification is compatible with both the process model framework and the data model framework. Each operation of the processes in the process model framework is associated with a respective service of the SOA solution. Data elements of the data model framework are mapped to inputs and outputs of component operations of the processes. The service specification is generated as an interface of the respective service in the SOA solution in terms of data elements of the data model framework. The interface specified in the service specification may be, inter alia, incoming/outgoing messages of the respective service, a set of coordinated interactions among multiple services, etc. The service specification enables consistent and effective implementation of the SOA solution by employing the data elements of the data model framework in specifying interfaces of the services instead of implementing the service interfaces of the SOA solution directly from the process inputs and outputs.

In step 100, the service specification generator retrieves the inputs comprising the process model framework and the data model framework. Then the service specification generator proceeds with step 200.

In step 200, the service specification generator decomposes processes of the process model framework by performing a process decomposer. See description of FIG. 4A infra for steps performed by of the process decomposer. Then the service specification generator proceeds with step 300.

In step 300, the service specification generator generates the service specification customized for the decomposed processes by performing a service specification customizer. See description of FIG. 5A infra for steps performed by the service specification customizer. Then the service specification generator proceeds with step 400.

In step 400, the service specification generator stores the generated service specification in the database and transfers the generated service specification to output devices of a computer system in which the service specification generator runs to communicate the generated service specification with users or other computer systems. See description of FIG. 6, infra, for details of the computer system. Then the service specification generator terminates.

The service specification generator enables developers of SOA solutions to automatically generate service specifications for the SOA solutions that correspond to services of the SOA solutions. By employing industry-specific data model framework, service specifications are generated in a normalized fashion. The service specification generator enables timely and cost-effective development and implementation of the SOA solutions by eliminating manual and arbitrary association of processes with service specifications as common in conventional method of defining service interfaces.

Figure 4A:
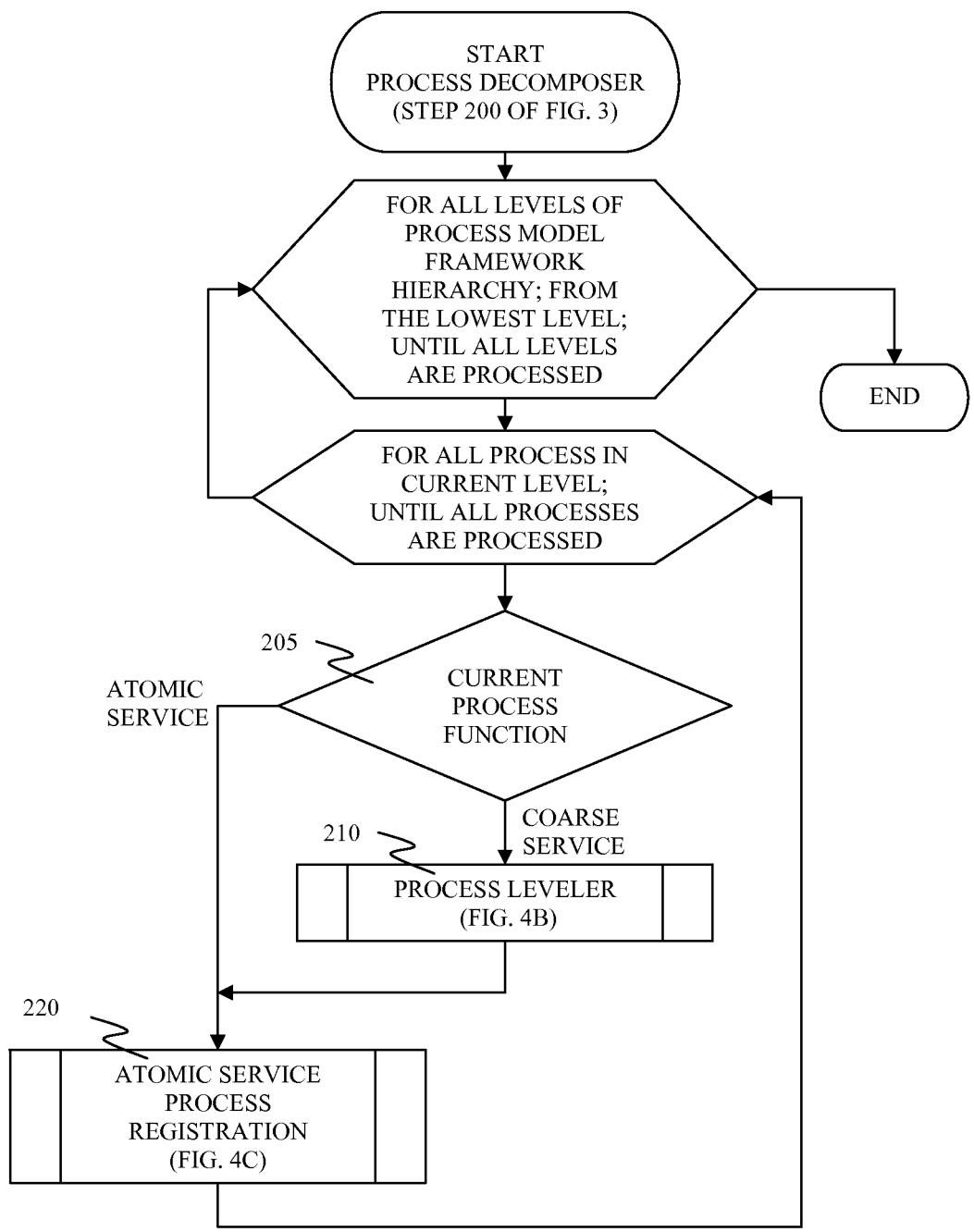
FIG. 4A is a flowchart depicting a method for deconstructing processes of the process model framework as performed by the process decomposer of step 200 in FIG. 3, in accordance with the embodiments of the present invention.

FIG. 4A is a flowchart depicting a method for deconstructing processes of the process model framework as performed by the process decomposer of step 200 in FIG. 3 supra, in accordance with the embodiments of the present invention.

Steps 205, 210 and 220 are performed for all processes in all levels of the process model framework hierarchy. The process decomposer selects the lowest level of the process model framework hierarchy as a current level in an outer loop. The process decomposer performs steps 205, 210 and 220 for each process in the current level in an inner loop. When the process decomposer finishes deconstructing all processes in the current level, then the process decomposer exits the inner loop and continues with the outer loop. In the outer loop, the process decomposer updates the current level with a next higher level in the process model framework hierarchy and proceeds with the inner loop to deconstruct each process in the updated current level. When the process decomposer completes all levels in the process model framework hierarchy, the process decomposer terminates and the service specification generator of FIG. 3 supra proceeds with the service specification customizer. In the embodiment wherein the process model framework is eTOM, the process model framework hierarchy has three (3) levels.

In step 205, the process decomposer determines a function of a current process. If the process decomposer determines that the current process performs a coarse service, then the process decomposer proceeds with step 210. If the process decomposer determines that the current process performs an atomic service, then the process decomposer proceeds with step 220.

In step 210, the process decomposer performs a process leveler to level the current process that performs the coarse service. See description of FIG. 4B infra for steps of the process leveler. Then the process decomposer proceeds with step 220.

In step 220, the process decomposer registers the current process that performs an atomic service. See description of FIG. 4C infra for steps of the registration of the atomic service process. Then the process decomposer proceeds with a next process in the current level.

Figure 4B:
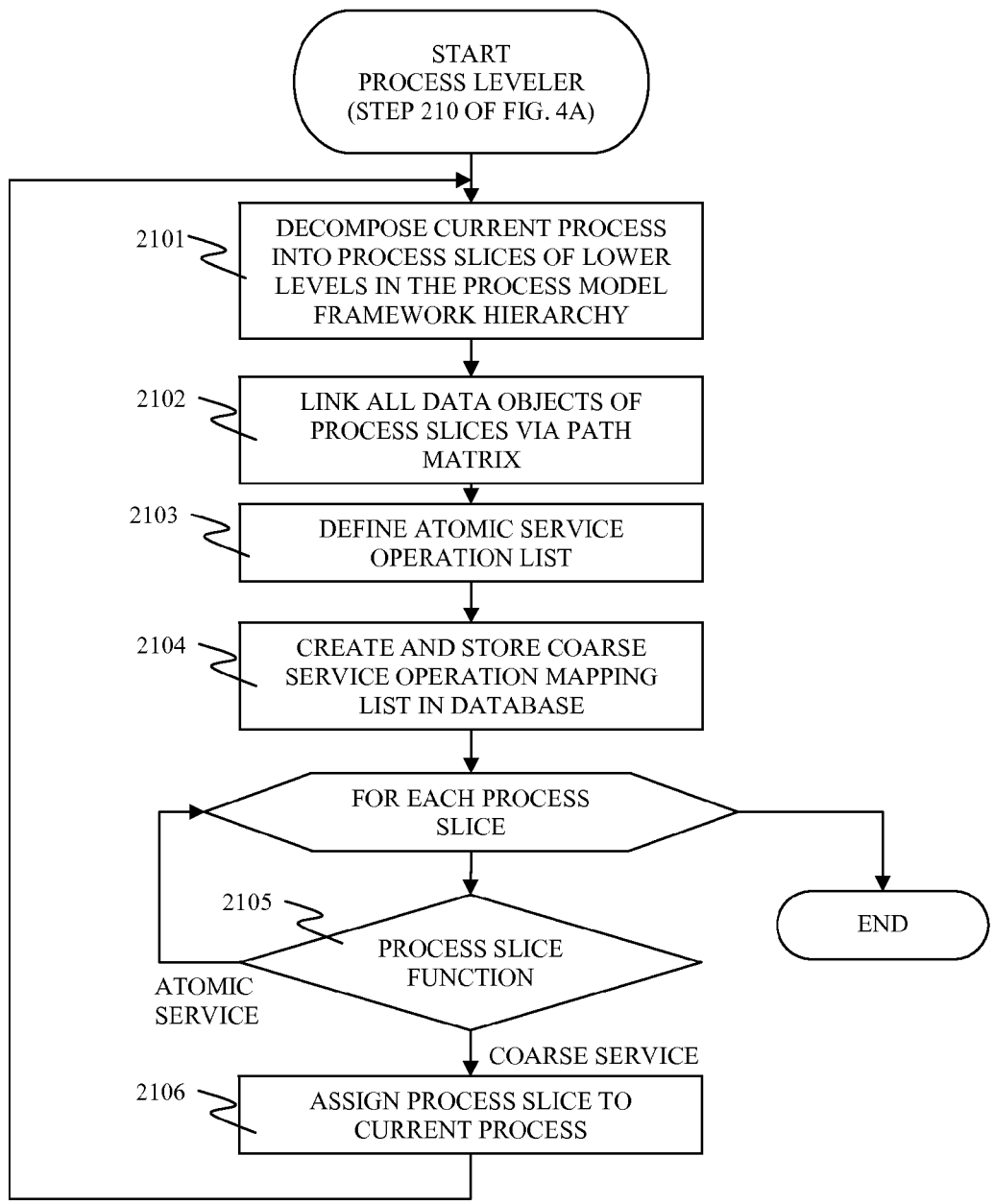
FIG. 4B is a flowchart depicting a method for automatically leveling an individual process of the business process model framework as performed by the process leveler of step 210 in FIG. 4A, in accordance with the embodiments of the present invention.

FIG. 4B is a flowchart depicting a method for automatically leveling an individual process of the business process model framework as performed by the process leveler of step 210 in FIG. 4A supra, in accordance with the embodiments of the present invention.

In step 2101, the process leveler decomposes the current process into process slices of lower levels in the process model framework hierarchy. The process leveler identifies a respective set of data objects associated with each process slice, wherein the respective set of data objects comprises a respective anchor object. Then the process leveler proceeds with step 2102.

In step 2102, the process leveler links the respective set of data objects for all process slices to the respective anchor object via respective path matrices. Then the process leveler proceeds with step 2103.

In step 2103, the process leveler defines the atomic service operation list that identifies unit services of the SOA solution and operations of the respective unit services. Then the process leveler proceeds with step 2104.

In step 2104, the process leveler creates the coarse service operation mapping list that maps all coarse services to a corresponding combination of atomic service operations, and subsequently stores the coarse service operation mapping list in the database. Then the process leveler proceeds with step 2105.

In step 2105, the process leveler determines, for each process slice that has been generated in step 2101, whether a current process slice provides an atomic service operation by searching the atomic service operation list for the current process slice. If the process leveler determines that the current process slice provides an atomic service operation, as said searching results in locating the current process slice in the atomic service operation list, then the process leveler performs step 2105 for a next process slice. If the process leveler determines that the current process slice does not provide an atomic service operation, as the current process slice is not found in said searching the atomic service operation list, then the process leveler proceeds with step 2106. Upon determining that all process slices provides a respective atomic service operation in step 2105, the process leveler terminates.

In step 2106, the process leveler assigns the current process slice to the current process. Then the process leveler loops back to step 2101 to level the current process into lower level process slices.

Figure 4C:
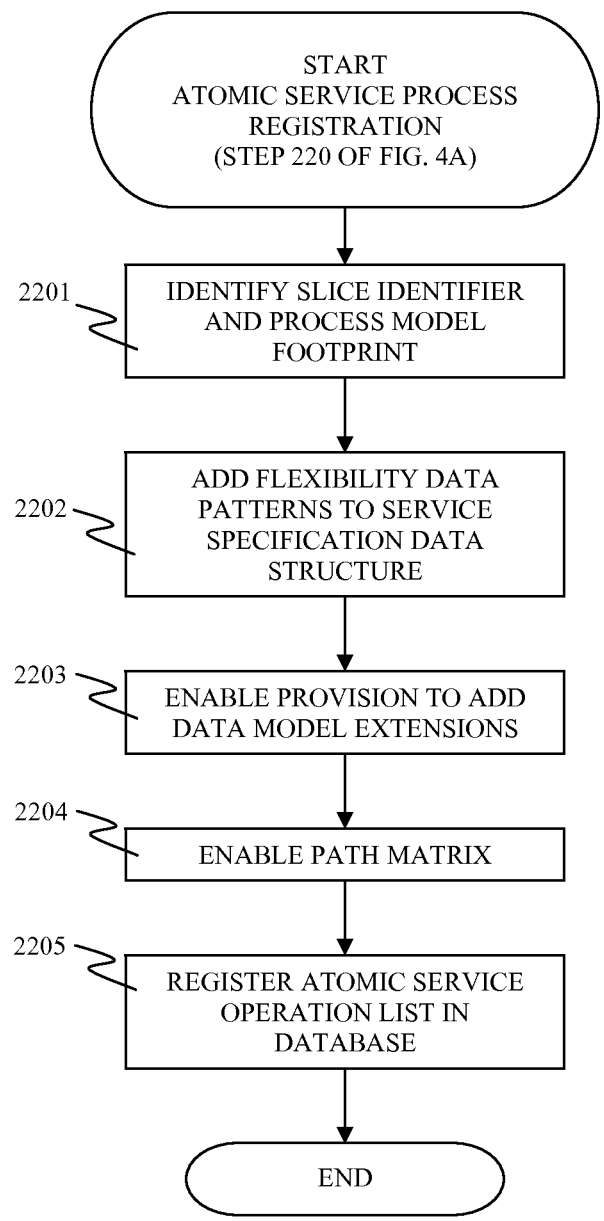
FIG. 4C is a flowchart depicting a method for automatically registering an atomic process to the database as performed in step 220 in FIG. 4A, in accordance with the embodiments of the present invention.

FIG. 4C is a flowchart depicting a method for automatically registering an atomic process to the database as performed in step 220 in FIG. 4A supra, in accordance with the embodiments of the present invention.

In step 2201, the process decomposer identifies at least one slice identifier of the current process from step 220 of FIG. 4A supra and a process model footprint associated with each slice identifier. Then the process decomposer proceeds with step 2202.

In step 2202, the process decomposer adds flexibility data patterns to the service specification data structure of the current process. Then the process decomposer proceeds with step 2203.

In step 2203, the process decomposer enables provision to add data model extensions to the service specification data structure of the current process. Then the process decomposer proceeds with step 2204.

In step 2204, the process decomposer enables the path matrix of the current process. Then the process decomposer proceeds with step 2205.

In step 2204, the process decomposer registers the atomic service operation list of the current process in database. Then the process decomposer proceeds with step 205 of FIG. 4A supra.

Figure 5A:
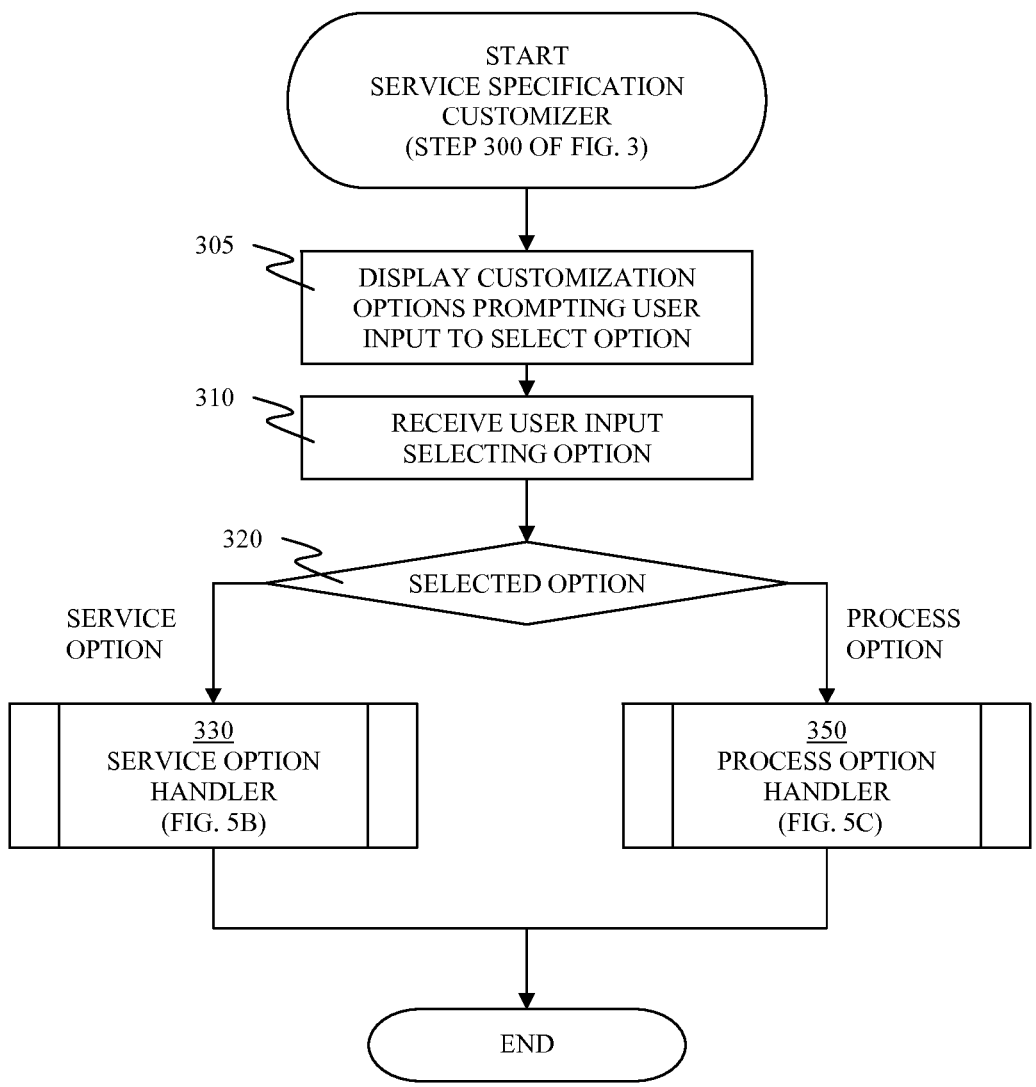
FIG. 5A is a flowchart depicting a method for automatically customizing a service specification of processes of the business process model framework pursuant to a data model framework as performed by the service specification customizer of step 300 in FIG. 3, in accordance with the embodiments of the present invention.

FIG. 5A is a flowchart depicting a method for automatically customizing a service specification of processes of the business process model framework pursuant to a data model framework as performed by the service specification customizer of step 300 in FIG. 3 supra, in accordance with the embodiments of the present invention.

In step 305, the service specification customizer displays customization options and prompts a user input to select an option. The customization options, or simply referred to as options, comprise a service option and a process option. Then the service specification customizer proceeds with step 310.

In step 310, the service specification customizer receives the user input selecting the customization option. Then the service specification customizer proceeds with step 320.

In step 320, the service specification customizer determines which option has been selected by the user. If the service specification customizer determines that the user had selected the service option, the service specification customizer proceeds with step 330. If the service specification customizer determines that the user had selected the process option, the service specification customizer proceeds with step 350.

In step 330, the service specification customizer performs a service option handler. See description of FIG. 5B infra for steps of the service option handler. After performing step 330, the service specification customizer terminates and the service specification generator proceeds with step 400 of FIG. 3 supra.

In step 350, the service specification customizer performs a process option handler. See description of FIG. 5C infra for steps of the process option handler. After performing step 350, the service specification customizer terminates and the service specification generator proceeds with step 400 of FIG. 3 supra.

Figure 5B:
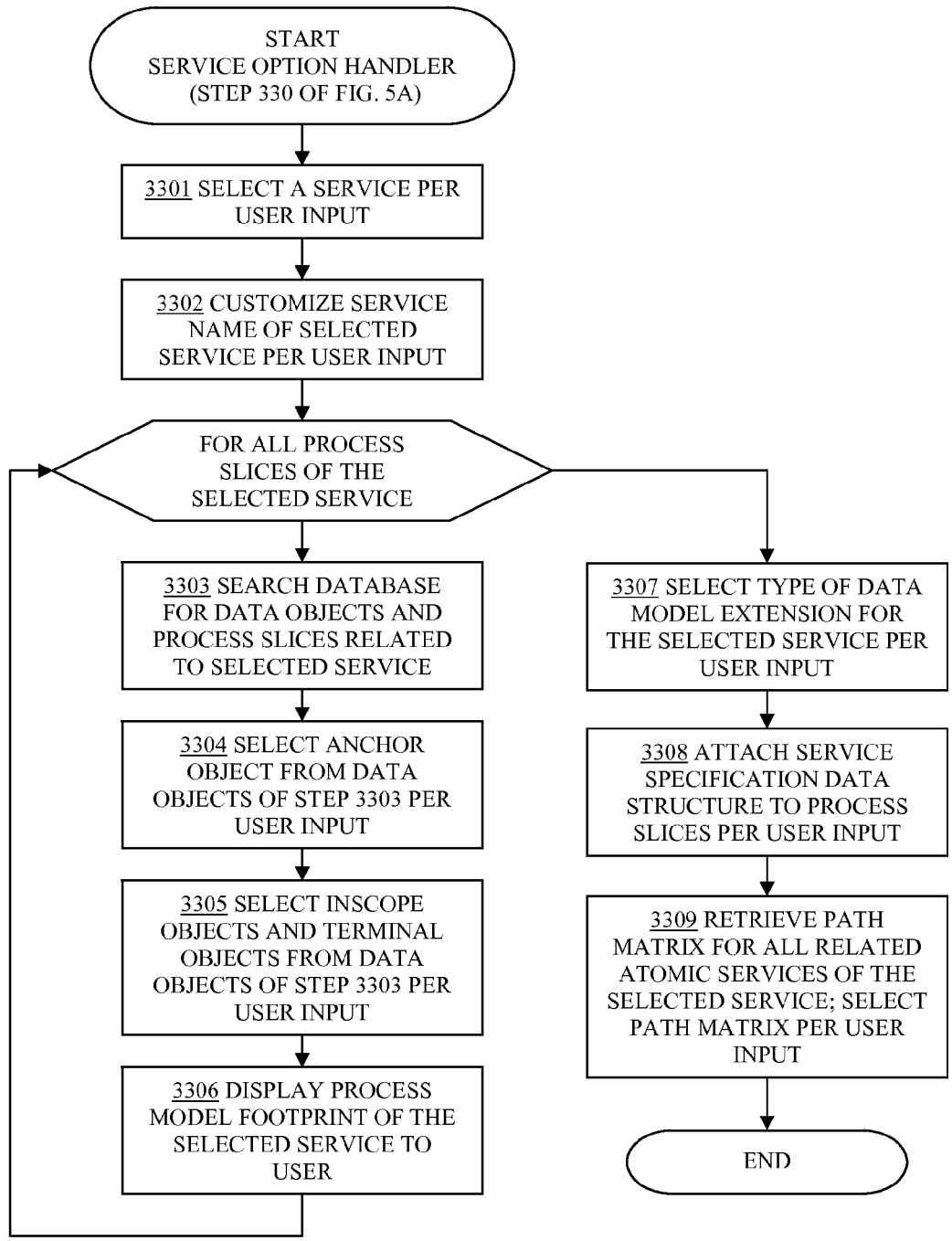
FIG. 5B is a flowchart depicting a method for automatically customizing a service specification of processes of the business process model framework pursuant to a data model framework as performed by the service option handler of step 330 in FIG. 5A, in accordance with the embodiments of the present invention.

FIG. 5B is a flowchart depicting a method for automatically customizing a service specification of processes of the business process model framework pursuant to a data model framework as performed by the service option handler of step 330 in FIG. 5A supra, in accordance with the embodiments of the present invention.

In step 3301, the service option handler selects a service according to the user input of step 310 of FIG. 5A supra. Then the service option handler proceeds with step 3302.

In step 3302, the service option handler customizes service names of the selected service according to the user input. Then the service option handler proceeds with step 3303.

The service option handler performs steps 3303, 3304, 3305, and 3306 as a loop for all component processes of the selected service.

In step 3303, the service option handler searches the database for data objects and process slices related to the selected service. Then the service option handler proceeds with step 3304.

In step 3304, the service option handler selects an anchor object of the selected service from the data objects located in step 3303 according to the user input. Then the service option handler proceeds with step 3305.

In step 3305, the service option handler selects in-scope objects and terminal objects of the selected service from the data objects located in step 3303 according to the user input. Then the service option handler proceeds with step 3306.

In step 3306, the service option handler displays a process model footprint of the selected service to the user. Then the service option handler loops back to step 3303 for a next component process of the selected service. Upon performing the loop comprising steps 3303 to 3306 for all component processes of the selected service, the service option handler proceeds with step 3307.

In step 3307, the service option handler selects types of the data model extension for the selected service according to the user input. Then the service option handler proceeds with step 3308.

In step 3308, the service option handler attaches a service specification data structure to process slices of the selected service according to the user input. Then the service option handler proceeds with step 3309.

In step 3309, the service option handler retrieves path matrices for all related atomic services of the selected service and prompts the user to select a path matrix. Then the service option handler terminates and the service specification generator of FIG. 3 supra proceeds with step 400.

Figure 5C:
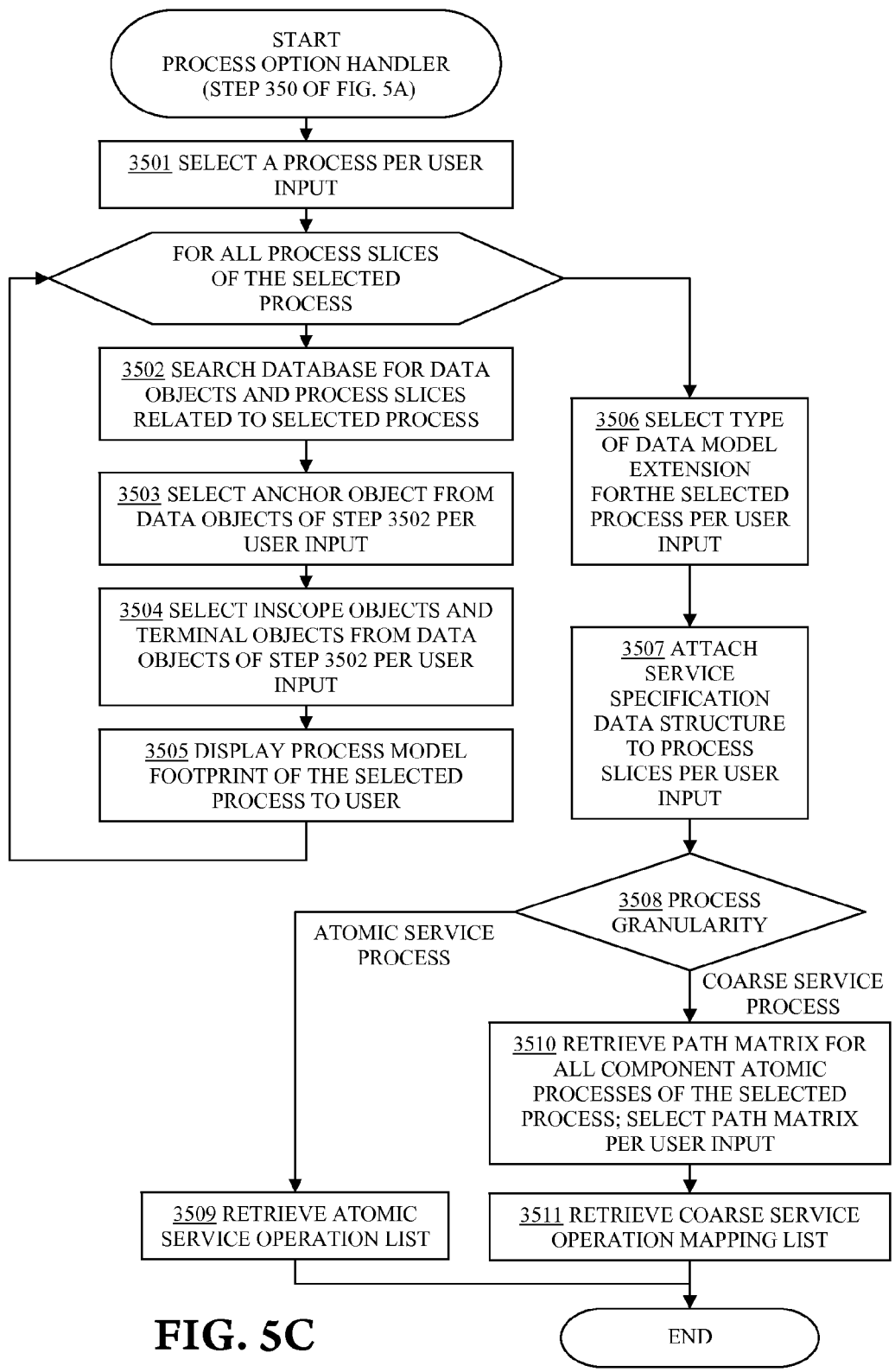
FIG. 5C is a flowchart depicting a method for automatically customizing a service specification of processes of the business process model framework pursuant to a data model framework as performed by the process option handler of step 350 in FIG. 5A, in accordance with the embodiments of the present invention.

FIG. 5C is a flowchart depicting a method for automatically customizing a service specification of processes of the business process model framework pursuant to a data model framework as performed by the process option handler of step 350 in FIG. 5A supra, in accordance with the embodiments of the present invention.

In step 3501, the process option handler selects a process according to the user input of step 310 of FIG. 5A supra. Then the process option handler proceeds with step 3502.

The process option handler performs steps 3502, 3503, 3504, and 3505 as a loop for all component processes of the selected process.

In step 3502, the process option handler searches the database for data objects and process slices related to the selected process. Then the process option handler proceeds with step 3503.

In step 3503, the process option handler selects an anchor object of the selected process from the data objects located in step 3502 according to the user input. Then the process option handler proceeds with step 3504.

In step 3504, the process option handler selects in-scope objects and terminal objects of the selected process from the data objects located in step 3502 according to the user input. Then the process option handler proceeds with step 3505.

In step 3505, the process option handler displays a process model footprint of the selected process to the user. Then the process option handler loops back to step 3502 for a next component process of the selected process. Upon performing the loop comprising steps 3502 to 3505 for all component processes of the selected process, the process option handler proceeds with step 3506.

In step 3506, the process option handler selects types of the data model extension for the selected process according to the user input. Then the process option handler proceeds with step 3507.

In step 3507, the process option handler attaches a service specification data structure to process slices of the selected process according to the user input. Then the process option handler proceeds with step 3508.

In step 3508, the process option handler determines a granularity level of the selected process. If the process option handler determines that the selected process is an atomic service process, then the process option handler proceeds with step 3509. If the process option handler determines that the selected process is a coarse service process, then the process option handler proceeds with step 3510.

In step 3509, the process option handler retrieves an atomic service operation list associated with the atomic service performed by the selected process as the selected process is an atomic service process. Then the process option handler terminates and the service specification generator of FIG. 3 supra proceeds with step 400.

In step 3510, the process option handler retrieves a respective path matrix for all component atomic process of the selected process as the selected process is a coarse service process. The process option handler also prompts the user to select a path matrix. Then the process option handler proceeds with step 3511.

In step 3511, the process option handler retrieves a coarse service operation mapping list associated with the selected process to locate atomic service operations to perform the selected process. Then the process option handler terminates and the service specification generator of FIG. 3 supra proceeds with step 400.

Figure 6:
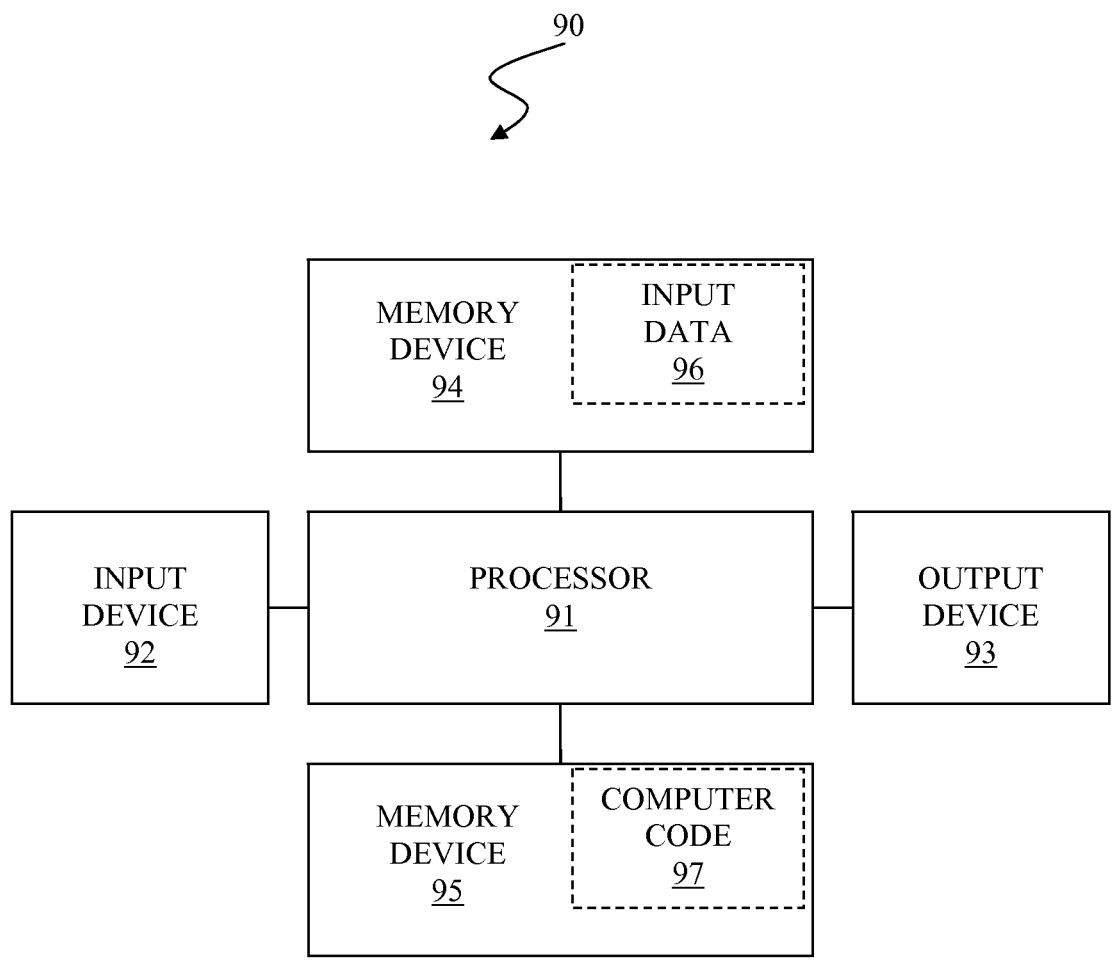
FIG. 6 illustrates a computer system used for automatically generating service specifications of a Service Oriented Architecture (SOA) solution, in accordance with the embodiments of the present invention.

FIG. 6 illustrates a computer system used for automatically generating service specifications of a Service Oriented Architecture (SOA) solution, in accordance with the embodiments of the present invention.

The computer system 90 comprises a processor 91, an input device 92 coupled to the processor 91, an output device 93 coupled to the processor 91, and computer readable memory units comprising memory devices 94 and 95 each coupled to the processor 91. The input device 92 may be, inter alia, a keyboard, a mouse, a keypad, a touch screen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program code that comprises computer-executable instructions. The computer code 97 includes, inter alia, an algorithm used for generating service specifications of the Service Oriented Architecture (SOA) solution according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may be used as a computer readable storage medium (or a computer usable storage medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer readable storage medium (or said program storage device).

Any of the components of the present invention can be deployed, managed, serviced, etc. by a service provider that offers to deploy or integrate computing infrastructure with respect to a process for dynamically building a web interface per data collecting rules of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for generating service specifications of the Service Oriented Architecture (SOA) solution.

In another embodiment, the invention provides a method that performs the process steps of the invention on a subscription, advertising and/or fee basis. That is, a service provider, such as a Solution Integrator, can offer to create, maintain, support, etc. a process for generating service specifications of the Service Oriented Architecture (SOA) of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) 94, 95 may be utilized. The term computer usable medium or computer readable medium collectively refers to computer usable/readable storage medium 94, 95. The computer-usable or computer-readable medium 94, 95 may be, for example but not limited to, an electronic, magnetic, optical, electromagnetic, infrared, or semiconductor system, apparatus, a device, or any suitable combination of the foregoing. More specific examples (a non-exhaustive list) of the computer-readable medium 94, 95 would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-usable or computer-readable medium 94, 95 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium 94, 95 may be any medium that can contain, or store a program for use by or in connection with a system, apparatus, or device that executes instructions.

Computer code 97 for carrying out operations of the present invention may be written in any combination of one or more programming languages, including an object oriented programming language such as Java, Smalltalk, C++ or the like and conventional procedural programming languages, such as the "C" programming language or similar programming languages. The computer code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer code 97" in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in the computer-readable medium 94, 95 that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automatically generating a service specification of a Service Oriented Architecture (SOA) solution, said method comprising:
    receiving, by a processor of a computer system, a process model framework and a data model framework, the process model framework comprising at least one process, each process of said at least one process performing a respective service of the SOA solution, each process being associated with a respective level in a hierarchy based on complexity of the respective service performed by each process, the data model framework comprising at least one data element that is indirectly matched to said at least one process;
    said processor decomposing each process into at least one atomic service process, each process operating to manipulate at least one data object of the SOA solution, said at least one data object associating each process to said at least one data element, such that each process is mapped to a respective set of said at least one atomic service process that manipulates a respective set of said at least one data object, wherein the respective set of said at least one atomic service process performs a service equivalent to the respective service performed by each process;
    said processor customizing the service specification of the SOA solution pursuant to at least one user input received from a user such that the service specification is compatible with both the process model framework and the data model framework, wherein the service specification represents a respective process interface of each atomic service process of said at least one atomic service process that performs a respective atomic service in the SOA solution; and
    said processor storing the customized service specification in a database coupled to the computer system, wherein the database comprises a data model extension and a service specification data structure such that the data model framework is enhanced with reusable attributes and patterns in generating another service specification.

2. The method of claim 1, said decomposing comprising:
    determining that a current process in a first level of the hierarchy performs a coarse service, the current process comprising at least one process slice in a second level of the hierarchy, wherein the second level is lower than the first level indicating that said at least one process slice performs a respective service less complex than the current process.

3. The method of claim 2, said decomposing further comprising:
    identifying said at least one process slice and one or more process slice data objects employed in said at least one process slice, wherein said at least one data object of the SOA solution comprises a collection of said one or more process slice data objects for all process slices of said at least one process slice.

4. The method of claim 3, said decomposing further comprising:
    linking identified process slice data objects via a path matrix of the current process;
    producing an atomic service operation list that enumerates at least one atomic service performed by said at least one process slice;
    recording the atomic service operation list in the database;
    generating, in the database, a coarse service operation mapping list that maps the coarse service to a combination of said at least one atomic service in the atomic service operation list; and
    upon determining that each process slice of said at least one process slice performs a respective atomic service, registering each process slice in the database such that the service specification of the SOA solutions comprise a respective process interface of the registered process slice.

5. The method of claim 1, said customizing comprising:
    selecting, according to a first input of said at least one user input, a service of the SOA solution for which the service specification is generated;
    modifying a name of the selected service according to a second input of said at least one user input;
    locating, from the database, a set of data objects employed in the selected service and a set of process slices that collectively provide the selected service;
    identifying an anchor object, in-scope objects, and terminal objects among the located data objects according to a third input of said at least one user input;
    displaying a process model footprint of the selected service to the user;
    selecting a type of the data model extension for the selected service according to a fourth input of said at least one user input;

attaching the service specification data structure to the set of process slices of the selected service according to a fifth input of said at least one user input;

retrieving, from the database, a set of path matrices for each process slice from the set of process slices; and selecting, from the retrieved set of path matrices, a path matrix to utilize in the service specification according to a sixth input of said at least one user input, wherein the customized service specification for the selected service comprises the name of the selected service, a respective slice identifier for each process slice, the anchor object, the in-scope objects, the terminal objects, the type of the data model extension, the service specification data structure, and the path matrix.

6. The method of claim 1, said customizing comprising:

selecting a process of the process model framework according to a first input of said at least one user input;

locating, from the database, a set of data objects employed in the selected process and a set of process slices that collective providing a service corresponding to the selected process;

identifying an anchor object, in-scope objects, and terminal objects among the located data objects according to a second input of said at least one user input;

displaying a process model footprint of the selected process to the user;

selecting a type of the data model extension for the selected process according to a third input of said at least one user input;

attaching the service specification data structure to the set of process slices of the selected process according to a fourth input of said at least one user input;

determining that the selected process performs a coarse service;

retrieving, from the database, a set of path matrices for each process slice from the set of process slices; and selecting, from the retrieved set of path matrices, a path matrix to utilize in the service specification according to a fifth input of said at least one user input; and wherein the customized service specification for the selected process comprises a respective slice identifier for each process slice, the anchor object, the in-scope objects, the terminal objects, the type of the data model extension, and the service specification data structure.

7. The method of claim 1, said customizing comprising:

selecting a process of the process model framework according to a first input of said at least one user input;

locating, from the database, a set of data objects employed in the selected process and a set of process slices that collective providing a service corresponding to the selected process;

identifying an anchor object, in-scope objects, and terminal objects among the located data objects according to a second input of said at least one user input;

displaying a process model footprint of the selected process to the user;

selecting a type of the data model extension for the selected process according to a third input of said at least one user input;

attaching the service specification data structure to the set of process slices of the selected process according to a fourth input of said at least one user input;

determining that the selected process performs an atomic service, wherein the selected process comprises a process slice that is associated with a slice identifier; and retrieving, from the database, the atomic service operation list, wherein the customized service specification for the selected process comprises the slice identifier, the anchor object, the in-scope objects, the terminal objects, the type of the data model extension, the service specification data structure, and the atomic service operation list.

8. The method of claim 1, wherein the process model framework is the Enhanced Telecom Operations Map (eTOM) from the Next Generation Operations Systems Software (NGOSS) Solution Frameworks, wherein the data model framework is the Shared Information/Data model (SID) from the NGOSS Solution Frameworks, and wherein the service specifications of the SOA solution is generated in Web Services Description Language (WSDL).

9. A computer program product comprising a computer readable hardware storage device storing a computer readable program code therein, said computer readable program code containing instructions configured to be executed by a processor of a computer system to perform a method for automatically generating a service specification of a Service Oriented Architecture (SOA) solution, said method comprising:

said processor receiving a process model framework and a data model framework, the process model framework comprising at least one process, each process of said at least one process performing a respective service of the SOA solution, each process being associated with a respective level in a hierarchy based on complexity of the respective service performed by each process, the data model framework comprising at least one data element that is indirectly matched to said at least one process;

said processor decomposing each process into at least one atomic service process, each process operating to manipulate at least one data object of the SOA solution, said at least one data object associating each process to said at least one data element, such that each process is mapped to a respective set of said at least one atomic service process that manipulates a respective set of said at least one data object, wherein the respective set of said at least one atomic service process performs a service identical to the respective service performed by each process;

said processor customizing the service specification of the SOA solution pursuant to at least one user input received from a user such that the service specification is compatible with both the process model framework and the data model framework, wherein the service specification represents a respective process interface of each atomic service process of said at least one atomic service process that performs a respective atomic service in the SOA solution; and said processor storing the customized service specification in a database, wherein the database comprises a data model extension and a service specification data structure such that the data model framework is enhanced with reusable attributes and patterns.

10. The computer program product of claim 9, said decomposing comprising:

determining that a current process in a first level of the hierarchy performs a coarse service, the current process comprising at least one process slice in a second level of the hierarchy, wherein the second level is lower than the first level indicating that said at least one process slice performs a respective service less complex than the current process.

11. The computer program product of claim 10, said decomposing further comprising:

identifying said at least one process slice and one or more process slice data objects employed in said at least one process slice, wherein said at least one data object of the SOA solution comprises a collection of said one or more process slice data objects for all process slices of said at least one process slice.

12. The computer program product of claim 11, said decomposing further comprising:
linking the identified one or more process slice data objects via a path matrix of the current process;
producing an atomic service operation list that enumerates at least one atomic service performed by said at least one process slice;
recording the atomic service operation list in the database;
generating, in the database, a coarse service operation mapping list that maps the coarse service to a combination of said at least one atomic service in the atomic service operation list; and
upon determining that each process slice of said at least one process slice performs a respective atomic service, registering each process slice in the database such that the service specification of the SOA solutions comprises a respective process interface of the registered process slice.

13. The computer program product of claim 9, said customizing comprising:
selecting, according to a first input of said at least one user input, a service of the SOA solution for which the service specification is generated;
modifying a name of the selected service according to a second input of said at least one user input;
locating, from the database, a set of data objects employed in the selected service and a set of process slices that collectively provide the selected service;
identifying an anchor object, in-scope objects, and terminal objects among the located data objects according to a third input of said at least one user input;
displaying a process model footprint of the selected service to the user;
selecting a type of the data model extension for the selected service according to a fourth input of said at least one user input;
attaching the service specification data structure to the set of process slices of the selected service according to a fifth input of said at least one user input;
retrieving, from the database, a set of path matrices for each process slice from the set of process slices; and
selecting, from the retrieved set of path matrices, a path matrix to utilize in the service specification according to a sixth input of said at least one user input,
wherein the customized service specification for the selected service comprises the name of the selected service, a respective slice identifier for each process slice, the anchor object, the in-scope objects, the terminal objects, the type of the data model extension, the service specification data structure, and the path matrix.

14. The computer program product of claim 9, said customizing comprising:
selecting a process of the process model framework according to a first input of said at least one user input;
locating, from the database, a set of data objects employed in the selected process and a set of process slices that collective providing a service corresponding to the selected process;
identifying an anchor object, in-scope objects, and terminal objects among the located data objects according to a second input of said at least one user input;
displaying a process model footprint of the selected process to the user;
selecting a type of the data model extension for the selected process according to a third input of said at least one user input;
attaching the service specification data structure to the set of process slices of the selected process according to a fourth input of said at least one user input;
determining that the selected process performs a coarse service;
retrieving, from the database, a set of path matrices for each process slice from the set of process slices;
selecting, from the retrieved set of path matrices, a path matrix to utilize in the service specification according to a fifth input of said at least one user input; and
retrieving, from the database, the coarse service operation mapping list such that a group of atomic services equivalent to the coarse service performed by the selected process is employed in the service specification,
wherein the customized service specification for the selected process comprises a respective slice identifier for each process slice, the anchor object, the in-scope objects, the terminal objects, the type of the data model extension, the service specification data structure, the path matrix, and the coarse service operation mapping list.

15. The computer program product of claim 9, said customizing comprising:
selecting a process of the process model framework according to a first input of said at least one user input;
locating, from the database, a set of data objects employed in the selected process and a set of process slices that collective providing a service corresponding to the selected process;
identifying an anchor object, in-scope objects, and terminal objects among the located data objects according to a second input of said at least one user input;
displaying a process model footprint of the selected process to the user;
selecting a type of the data model extension for the selected process according to a third input of said at least one user input;
attaching the service specification data structure to the set of process slices of the selected process according to a fourth input of said at least one user input;
determining that the selected process performs an atomic service, wherein the selected process comprises a process slice that is associated with a slice identifier; and
retrieving, from the database, the atomic service operation list,
wherein the customized service specification for the selected process comprises the slice identifier, the anchor object, the in-scope objects, the terminal objects, the type of the data model extension, the service specification data structure, and the atomic service operation list.

16. A computer system comprising a processor, a memory coupled to the processor, and a computer readable storage device coupled to the processor, said storage device containing program code configured to be executed by the processor via the memory to implement a method for automatically generating a service specification of a Service Oriented Architecture (SOA) solution, said method comprising:
receiving a process model framework and a data model framework, the process model framework comprising at least one process, each process of said at least one process performing a respective service of the SOA solution, each process being associated with a respective level in a hierarchy based on complexity of the respective service performed by each process, the data model framework comprising at least one data element that is indirectly matched to said at least one process;

decomposing each process into at least one atomic service process, each process operating to manipulate at least one data object of the SOA solution, said at least one data object associating each process to said at least one data element, such that each process is mapped to a respective set of said at least one atomic service process that manipulates a respective set of said at least one data object, wherein the respective set of said at least one atomic service process performs a service identical to the respective service performed by each process;

customizing the service specification of the SOA solution pursuant to at least one user input received from a user such that the service specification is compatible with both the process model framework and the data model framework, wherein the service specification represents a respective process interface of each atomic service process of said at least one atomic service process that performs a respective atomic service in the SOA solution; and storing the customized service specification in a database, wherein the database comprises a data model extension and a service specification data structure such that the data model framework is enhanced with reusable attributes and patterns.

17. The computer system of claim 16, said decomposing comprising:

determining that a current process in a first level of the hierarchy performs a coarse service, the current process comprising at least one process slice in a second level of the hierarchy, wherein the second level is lower than the first level indicating that said at least one process slice performs a respective service less complex than the current process.

18. The computer system of claim 17, said decomposing further comprising:

identifying said at least one process slice and one or more process slice data objects employed in said at least one process slice, wherein said at least one data object of the SOA solution comprises a collection of said one or more process slice data objects for all process slices of said at least one process slice.

19. The computer system of claim 18, said decomposing further comprising:

linking the identified one or more process slice data objects data objects via a path matrix of the current process;

producing an atomic service operation list that enumerates at least one atomic service performed by said at least one process slice;

recording the atomic service operation list in the database;

generating, in the database, a coarse service operation mapping list that maps the coarse service to a combination of said at least one atomic service in the atomic service operation list; and upon determining that each process slice of said at least one process slice performs a respective atomic service, registering each process slice in the database such that the service specification of the SOA solutions comprises a respective process interface of the registered process slice.

20. A procedure for supporting computer infrastructure, said procedure comprising providing at least one support service for at least one of creating, integrating, hosting, maintaining, and deploying computer-readable code in a computer system, wherein the code in combination with the computer system performs the method of claim 1.

* * * * *